Oct. 27, 1959  A. CALLAHAN  2,909,881
COMBINATION MOWER, DRIER AND BALER
Filed July 17, 1956  3 Sheets-Sheet 1
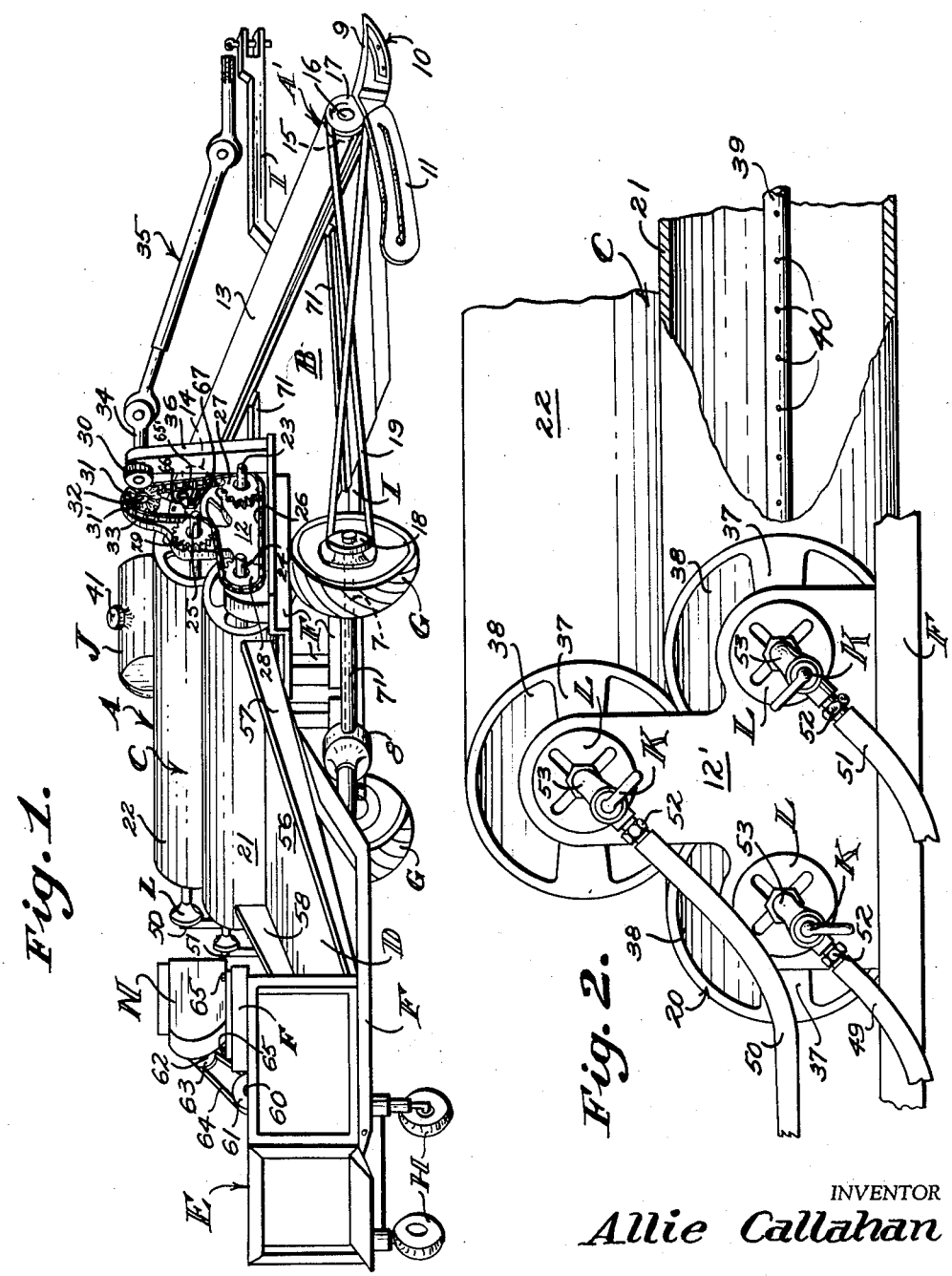
INVENTOR
*Allie Callahan*
BY *Shreve, Crowe & Gordon*
ATTORNEYS Oct. 27, 1959  A. CALLAHAN  2,909,881
COMBINATION MOWER, DRIER AND BALER
Filed July 17, 1956  3 Sheets-Sheet 2

INVENTOR
*Allie Callahan*

BY *Shreve, Crowe & Gordon*

ATTORNEYS

Oct. 27, 1959

A. CALLAHAN 2,909,881

COMBINATION MOWER, DRIER AND BALER

Filed July 17, 1956

Allie Callahan
INVENTOR

BY *Shreve, Crowe & Gordon*

ATTORNEYS

United States Patent Office 2,909,881
Patented Oct. 27, 1959

2,909,881

COMBINATION MOWER, DRIER AND BALER

Allie Callahan, Thomaston, Ga.

Application July 17, 1956, Serial No. 598,438

3 Claims. (Cl. 56—1)

The present invention relates to an agricultural machine and more particularly provides certain improvements in hay harvesting machines which includes combined mowing, drying, and baling instrumentalities, all of which are mounted on a common chassis frame, each unit of the machine feeding directly from one to the other as the machine is pulled over an area being mowed.

The invention provides a combined mowing, drying, and baling machine which is characterized by structural compactness and ease of transport, and wherein all requisite operations for hay harvesting are performed by a single machine. There is provided by the present invention a combined cutting, drying, and baling apparatus which constitutes a complete harvesting plant for the treatment of grass and other moist substances, and it provides a compact and highly efficient apparatus or machine adapted for harvesting grass, hay and grass-like crops such as clover, alfalfa, lupin, and other moist grassy materials which require to be treated in course of the cutting operation, for the rapid removal of the moisture content and the baling of the resulting cured material for storing and shipping.

A further object of the invention is to provide a combined mowing, drying and baling machine which is adapted to be transported readily by a prime mover vehicle such as a tractor over a harvesting field for harvesting the crop, the mowing, curing, and baling of the crop being accomplished by the single machine as it moves over a hay field being cut and harvested, the operation being greatly expedited by the present improved equipment with important economies in time and labor being effected.

According to the instant invention, the present improved machine provides, in combination, a chassis frame mounted on traction wheels connected by an axle shaft, means for mowing or cutting the grassy material being harvested, endless conveyor means receiving the material from the mowing means and delivering the mowed and collected material to a drying assembly including heated rotary drums or cylinders through and between which the material is compressingly passed and also including a source of combustible fuel which is supplied therefrom to burners mounted in the drums or cylinders, the rotation of which dries and tends to cure the mowed material and feeds it to baling means, wherein the treated material is pressed or packaged into bales.

According to a further feature of the invention, the combine hay harvesting plant comprising the combination of means aforesaid is mounted on a common wheeled support or chassis adapted to be hauled over the ground by a tractor or other source of transporting power having a power take-off, the mowing means on the chassis frame being adapted to mow the crop being harvested, and to pass the resulting material to the successive units of the combine.

An important object of this invention is the provision, and structural arrangement and mounting of the drying cylinders intermediate the moving and baling units and the burner means within the cylinders, and the construction of and arrangement of fuel delivery means and respective fuel and air mixing chambers and the control means therefor for the respective drying cylinders, and comprising tractor power take off and cylinder drive means in conjunction therewith for effecting rotation of the cylinders as a unit during the cutting operation.

Another important object of this invention is the provision of a common drive means for the respective machine units, clutch means in said common drive adjacent to said baler unit, an auxiliary power means carried by said chassis frame having disconnectable normally inoperative driving connection with said common drive means, the operation of said clutch adapted to cut off the main drive to the baler and cut in the auxiliary drive thereto to enable operation of the baler when the machine proper is stationary.

Further objects will become apparent as the description proceeds, and the features of novelty will be set forth in the appended claims. The invention will be understood more readily by reference to the accompanying drawings, in which:

Fig. 1 is a perspective view of the improved combined machine of the present invention.

Fig. 2 is an enlarged fragmentary isometric view of the dehydrating means of the improved machine, the view showing certain details of the heating means used for heating the cylinder drying assembly, and for supplying heating fuel thereto, parts being broken away and shown in section.

Fig. 4 is an enlarged fragmentary isometric view of the drying cylinders showing their mounting and gear driving arrangement for effecting rotation of the said cylinders.

Fig. 5 is a fragmentary view of the drive from the common driving axle to the moving unit and to the baler unit.

Figure 3:
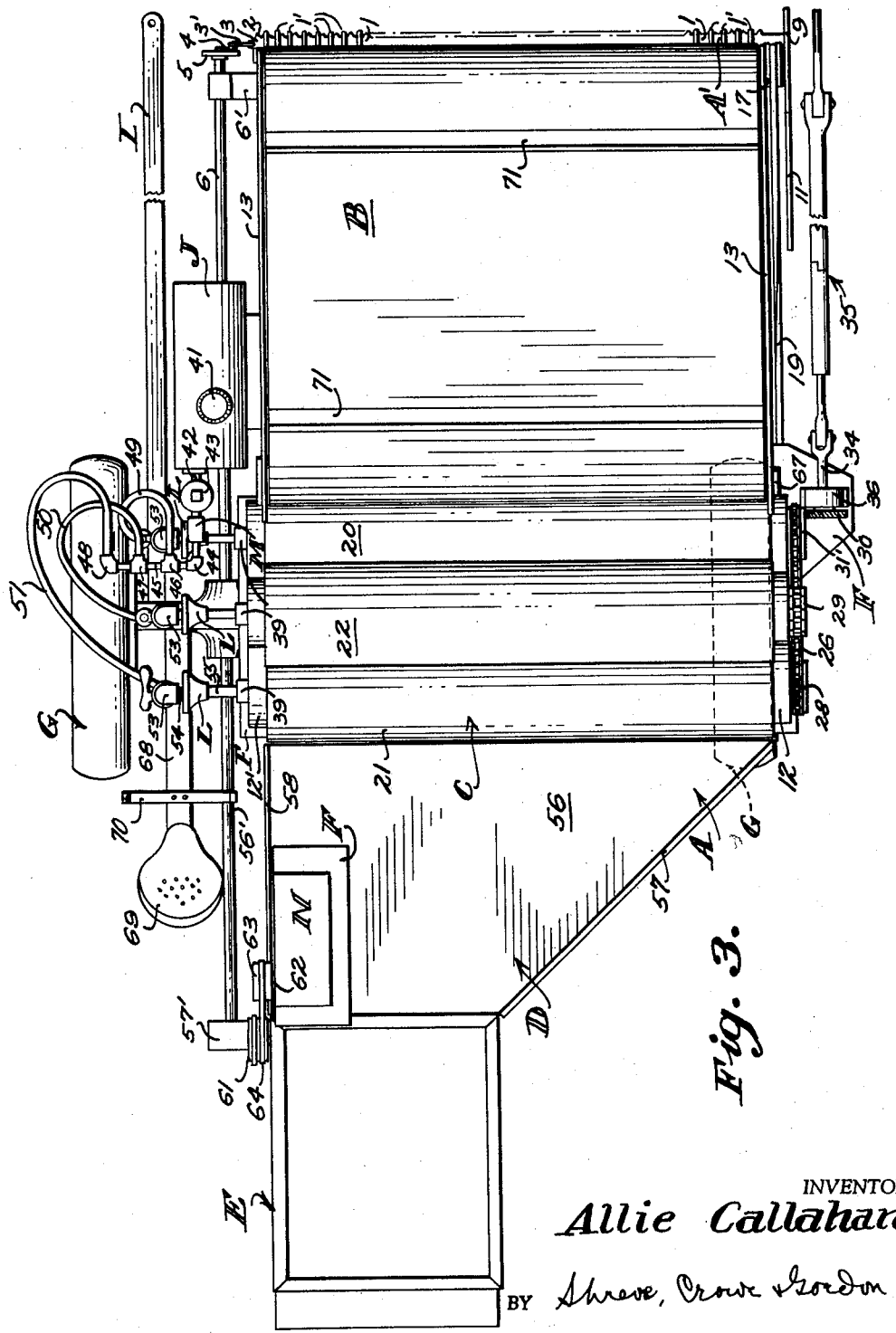
Fig. 3 is a plan view of the improved machine of the present invention.

In the illustrated embodiment characterizing this invention there is shown a unitary combined mower, dryer and baler assembly indicated generally at A, an endless conveyor B, which receives the mowed crop from the mowing assembly A' and delivers the same to the drying assembly C, from which the dried material is fed onto a delivery apron D which delivers the material to a baling means E, all of these units or assemblies being mounted on a common chassis frame F which is mounted on the traction wheels G for enabling the ready transporting of the machine by a tractor or other motive vehicle, not shown, but coupled to a draw bar I. The respective assemblies or parts of the machine will be described in detail hereinafter.

A pair of supporting caster wheels H may be provided, if needed for supporting the rear end of the machine or baler structure, and permitting rearward or backing movement thereof.

The mowing assembly A' comprises a cutter bar 1 having slotted fingers or guards 1' through which the cutter 2 of the blade 3 are reciprocated by the blade arm 3' driven by the eccentric connection 4 on the drive wheel 5 mounted on the end of drive shaft 6 driven by cooperating gears (not shown), one of which is mounted on the rear end of shaft 6, and the other, being the drive gear, is mounted on axle drive shaft 7 connecting traction wheels G, the said gears being positioned in the housing 8 on the axle shaft 7. The drive shaft 6 is rotatably supported in the arm 6' suitably mounted on the sideboard structure 13.

Suitably secured to each end of the cutter bar 1 is a guard shoe 9 having an arcuate bottom surface 10 adapted to slidably engage the ground surface and carried by each end of said cutter bar in substantial alignment with the respective shoes 9 and extending rearwardly are, in the present instance, the elongated arcuate slotted arms 11 adapted to prevent the cutter bar assembly from digging in the ground surface when the machine is moved in a rearward direction.

The shoes 9 and curved runner arms 11 stabilize and permit the mowing unit or assembly A' to slidably move over the terrain being mowed.

Suitably secured to the frame structure F and the frame vertical standards 12 and 12' carried thereby, are the elevator or endless conveyor sideboard members 13, between and in which at their upper and lower ends are journaled rollers 14 and 15, respectively, over which is adapted to travel the endless conveyor B for delivering the mowed material to the drying and material advancing cylinder assembly C. One of the trunnions 16 of the lower roller 15 extends beyond the sideboard 13 and on which is mounted a pulley 17, and suitably mounted on the traction wheel G or end of axle 7 is a drive pulley 18 and mounted on said pulleys 17 and 18 is a belt 19 for driving the endless conveyor B.

The conveyor B delivers mowed material to the drying assembly C, which comprises a pair of heated bottom rolls or drums, 20, 21 which are surmounted by a similar top heated roll or drum 22, which is in registry with both bottom rolls 20 and 21, the mowed material from conveyor B being passed between the pair of bottom rolls 20—21 and the top roll 22, the heat of the rolls drying the mowed material which also is initially compressed by the pressure exerted thereon by the top and bottom rolls as the mowed material is fed through this drying assembly C. The drying and compressing rolls 20, 21 and 22 (Fig. 4) are mounted on stub shafts 23, 24 and 25, respectively, that are turnably mounted in the bearing standard 12, said rolls being driven simultaneously and equally, by an endless sprocket chain 26 passing around sprockets 27, 28 and 29 on shafts 23, 24 and 25 of the respective rolls. This arrangement is shown best in Fig. 4. The rolls 20, 21 and 22 are rotated by means of a driving pinion 30 meshing with the gear face 31 of driving sprocket 31' on stub shaft 32 mounted in the off-set arm portion 33 of bearing standard 12, the pinion 30 being mounted on and driven by shaft portion 34 which is driven in turn by power-transmission linkage 35 connected to the power take-off, not shown, of the tractor providing the motive power for moving the machine over the ground being mowed. The shaft portion 34 is journaled in standard 36 on frame structure F.

The shafts 23, 24 and 25 on the drive ends of the rolls 20, 21 and 22 are secured to web members 37 suitably mounted on the ends of the drying rolls 20, 21 and 22 and which are formed with air openings 38.

Positioned in each of the drying rolls 20, 21 and 22 is a burner pipe or tube 39 closed at its free end and provided with a multiplicity of perforations or burner openings 40 extending throughout its length. The burner tubes 39 extend through and may extend slightly beyond the standard 12' and to which they are secured against rotation. Said tubes are journaled in the webs 37 adjacent to said standard 12', thereby permitting free rotation of said rolls when being driven by sprocket chain 26.

Mounted on frame F above the shaft 6 is a liquid fuel or compressed gas tank J having a removable inlet cap 41 and a fuel lead off pipe 42, in which is mounted a main fuel cut-off valve 43, said pipe 42 being connected by an elbow fitting 44 to a manifold pipe or header 45, in which is mounted a pair of spaced similar fittings 46 and 47, and mounted on the free end of header pipe 45 is a fitting 48, similar to fitting 44. Connected to fitting 46 is a fuel feed flexible hose line 49, and to fitting 47 is a feed hose 50, and to fitting 48 is a similar feed hose 51, adapted to furnish fuel to the heated rolls 20, 22 and 21.

The free ends of the hose lines 49, 50 and 51 are connected by unions 52 to the fuel control valve means K, the opposite elbow ends 53 of which are adapted for connection with the outer ends of pipe portions 54 of the fuel and air control mixing chambers and fuel delivery units L, the opposite pipe end portions 55 of said units are adapted to project within the ends of the burner pipes of said drying rolls or cylinders 20, 22 and 21. Mounted adjacent to the main cut-off valve 43 is a fuel meter M.

The structure D is adapted to receive the heat treated mowed material from the drying assembly C and deliver it to the baler unit E, said structure comprising a downwardly inclined apron member 56 extending from roll 21 of the drying roll assembly C to the baler unit E and having on opposite edges thereof sideboards 57 and 58, said structure being mounted on and suitably secured to the frame structure F.

During the normal operation of the combined mowing, drying and baling units or assemblies, the main drive is from axle 7 in gear housing 8 through shaft 6 to the cutting assembly A', and similarly from axle 7 in gear housing 8 in the opposite direction during the forward travel of the machine A, through drive shaft 56', conventional inter-meshing gears, not shown, in gear box 57', shaft 58', clutch structure 59, shaft 60 to baler E for operation of the latter; and mounted on shaft 60 is a pulley 61.

However, in view of an emergency, weather conditions, etc. and also, in order to render it possible when desired, to utilize the baler when the machine is not moving in mowing direction, an auxiliary motor N is mounted on frame structure F, and on drive shaft 62 of which is mounted a pulley 63, and connecting and adapted to travel over said pulleys 61 and 63 for driving said baler E is a belt 64. The motor N is secured to the frame by bolts 65. It will be apparent that during the normal mowing operation of the machine the clutch 59 is in driving engagement and the belt 64 is removed from pulleys 61 and 63, so that the main drive is completed from 7 through gear box 57', shaft 58', clutch 59, shaft 60 to baler E. When the machine is stationary, the drive from the auxiliary motor N to the baler E is effected by placing the belt 64 on pulleys 61 and 63, thereby throwing out the clutch 59 and starting the auxiliary motor N.

It will be noted that in order to render the mowing assembly A' flexible to compensate for uneven terrain as it passes thereover, the sideboards 13 are loosely mounted at their upper ends by means of rod elements 65' extending through slots 66 (Fig. 1) therein, said rods being secured in brackets 67 (Fig. 3). Also, it will be noted that draw bar I is suitably mounted on the axle housing 7' of main axle 7, and the spring arm 68 carrying the operator's seat 69 and handle bars 70 is likewise suitably mounted on said axle housing 7'. In connection with the endless conveyor B it will be observed, that in order to insure an even elevation of the mowed material without slippage to the drying roll assembly C, said endless conveyor B is provided with a plurality of spaced lateral cleats 71.

The rolls are heated sufficiently to dry the mowed crop as it passes between the rolls. The dried crop is passed from the rolls onto an apron 56, which delivers the dried material to baling means E, such being a conventional baling assembly driven normally by the main axle 7, and when the machine A is stationary, by an auxiliary internal combustion engine N, the pulley 63 of which is connected to pulley 61 of the baler for operating said baler. The material is supplied continuously from the drying rolls C to the apron 56 and thence to baler unit by gravity. It will be apparent that the material is supplied directly to the baler unit E from the rolls in a continuous manner, and both the baler unit and the engine N for operating the baler, when the machine proper is stationary, are mounted on the chassis frame of the vehicle along with the other units of the combined machine. Upstanding sideboards 57 and 58 are provided for apron 56 for directing the dried material into the baler unit.

From the above it will be apparent that I have provided a unitary combine machine including a traction wheel and wheel connecting axle assembly, a machine frame structure mounted on said assembly, and which carries the cooperating grass or the like material cutting assembly, cut material drying rolls assembly and dried material baling assembly. Also mounted on the frame is a source of combustible fuel for the burner tubes mounted in each of the rolls of the drying assembly, conduit means from said source to the respective burner tubes and including fuel control means, a drive from the traction wheel axle to the material cutting assembly and main drive from said axle rearwardly to the baler unit, including a clutch means, an auxiliary motor mounted on said frame, having removable drive connection with said baler, said clutch means being operable to switch the main drive to the auxiliary motor drive for operating the baler when the machine is not in mowing operation, or in an emergency, when it is in such operation, and means for moving the cut material from the mowing assembly through the heating rolls and to the baler unit, such combine machine being of simple construction, manufacturable at a minimum of cost and efficient for the purpose intended.

It will be apparent from the foregoing description and accompanying drawings that there is represented and described herein a preferred illustrative embodiment of an improved combine for mowing, drying, and baling grass and grass-like hay crops, but also it will be apparent that structural details of the machine may be varied and modified without departing from the inventive concept, and accordingly it will be understood that it is intended and desired to embrace within the scope of the invention such modifications and changes as may be necessary or desirable to adapt it to varying conditions and uses, as defined by the appended claims:

What is claimed is:

1. In a hay harvesting combine machine for harvesting grass and grass-like crops having a machine frame, a pair of spaced traction wheels carrying the machine frame, a mowing assembly at the forward end of the frame, and a baling unit at the rearward end of the frame; a drying and curing assembly disposed in an intermediate portion of a machine frame, said drying and curing unit comprising a plurality of drying rolls carried by the machine frame adapted to be positioned adjacent to the endless conveyor for receiving material from the conveyor, there being a pair of lower rolls and an upper roll intermediate the pair of lower rolls, and in registry with both lower rolls of the pair, thereof, material from the conveyor being passed between the upper roll and the pair of lower rolls, vertical bearing standards mounted on the machine frame, stub shafts mounting the rolls in the bearing standards, heating means in each of the rolls extending longitudinally thereof, a fuel supply tank carried by the machine frame, fuel supply lines connecting the supply tank to the heating means, control means for controlling flow of fuel from the supply tank to the heating means, driving means for the rollers for simultaneously and equally rotating the rollers first to compress the material supplied to the rollers and then to dry such material.

2. In a combine hay harvesting machine for mowing, drying, curing, and baling hay, a chassis frame, a drying roll assembly mounted on the chassis frame, the drying roll assembly comprising a pair of lower rollers and an upper roller registering with both lower rollers of the pair for compressing mowed material received from an endless conveyor, tubular heating means mounted in each roller and extending longitudinally axially therethrough, a source of fuel supply for the heating means carried by the chassis frame, fuel supply conduits interconnecting the source of fuel supply to the respective heating means in the rollers, cooperating driving means on the rollers for simultaneously rotating the rollers at equal speeds, and driving means for the rollers connecting one of the rollers to a source of power therefor for rotating the rollers.

3. A drying and curing assembly for use in a combine hay harvesting machine and the like, comprising a mobile frame, a set of hollow rollers arranged to convey cut hay from one end of the set to the other end thereof, means rotatably mounting said rollers on said frame, means on said frame for conveying cut hay to said one end of the set of rollers, means for driving said rollers to convey hay from one end of said set to the other, a burner pipe disposed in each roller and extending for the full length thereof for heating said roller, means supplying fuel to said burner pipes to provide for continuous heating of the rollers, and valves for individually controlling the fuel to each roller so that the amount of heat supplied thereto may be varied, said means rotatably mounting said rollers being arranged so that the rollers apply pressure to hay passing through the set.

References Cited in the file of this patent
UNITED STATES PATENTS

| | | |
|---|---|---|
| 2,048,940 | MacGregor | July 28, 1936 |
| 2,101,439 | Lindgren et al. | Dec. 7, 1937 |
| 2,397,363 | McLeod | Mar. 26, 1946 |
| 2,521,999 | Scott | Sept. 12, 1950 |

FOREIGN PATENTS

| | | |
|---|---|---|
| 14,295 | Australia | Sept. 11, 1933 |